(12) United States Patent
Foley et al.

(10) Patent No.: US 9,987,805 B2
(45) Date of Patent: Jun. 5, 2018

(54) CLEANING CART WITH RECHARGEABLE POWER SUPPLY

(71) Applicant: Xerox Corporation, Norwalk, CT (US)

(72) Inventors: Timothy P. Foley, Marion, NY (US); Elizabeth M Crossen, Churchville, NY (US); Christopher D. Atwood, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 441 days.

(21) Appl. No.: 14/693,066

(22) Filed: Apr. 22, 2015

(65) Prior Publication Data

US 2016/0311174 A1 Oct. 27, 2016

(51) Int. Cl.
| | |
|---|---|
| *B29C 67/00* | (2017.01) |
| *G05B 19/4099* | (2006.01) |
| *B33Y 50/02* | (2015.01) |
| *B29C 64/20* | (2017.01) |
| *B29C 64/386* | (2017.01) |
| *B29C 64/35* | (2017.01) |
| *B29C 64/112* | (2017.01) |

(52) U.S. Cl.
CPC .......... *B29C 67/0096* (2013.01); *B29C 64/20* (2017.08); *B29C 64/35* (2017.08); *B29C 64/386* (2017.08); *B33Y 50/02* (2014.12); *G05B 19/4099* (2013.01); *B29C 64/112* (2017.08)

(58) Field of Classification Search
CPC .............................. B29C 67/0096; B33Y 30/00
USPC ........................................................ 700/119
See application file for complete search history.

(56) References Cited

U.S. PATENT DOCUMENTS

| | | | |
|---|---|---|---|
| 2,765,547 A | 10/1956 | Dimmel et al. | |
| 2,944,275 A | 7/1960 | Markusen | |
| 3,850,691 A * | 11/1974 | Bleil | E01H 8/105 |
| | | | 104/279 |
| 4,741,072 A * | 5/1988 | Wilkerson | E01H 8/00 |
| | | | 15/312.1 |
| 5,904,100 A | 5/1999 | Findley et al. | |
| 6,191,507 B1 | 2/2001 | Peltier et al. | |
| 6,688,021 B2 | 2/2004 | Baig et al. | |
| 7,070,250 B2 | 7/2006 | Lester et al. | |
| 8,167,395 B2 | 5/2012 | Fienup et al. | |
| 8,288,004 B2 | 10/2012 | Moorlag et al. | |
| 8,371,229 B1 * | 2/2013 | Sailor | E01H 8/00 |
| | | | 104/279 |
| 8,692,011 B2 | 4/2014 | Moorlag et al. | |
| 8,851,664 B2 | 10/2014 | Spence | |
| 9,289,947 B1 * | 3/2016 | Fromm | B29C 67/0096 |

(Continued)

FOREIGN PATENT DOCUMENTS

EP 2 474 418 B1 7/2012

*Primary Examiner* — Mark Connolly
(74) *Attorney, Agent, or Firm* — Maginot Moore & Beck LLP (57) ABSTRACT

A cart that moves through a three-dimensional object printing system includes a platform and a cleaning device configured to remove material from a surface as the platform passes the surface. The cart further includes a rechargeable power supply configured to be connected to the cleaning device. A controller onboard the cart is operatively connected to the rechargeable power supply and the cleaning device. The controller is configured to connect the rechargeable power supply to the cleaning device and operate the cleaning device to clean the surface.

20 Claims, 8 Drawing Sheets

(56) References Cited

U.S. PATENT DOCUMENTS

| | | | |
|---|---|---|---|
| 9,469,076 B1* | 10/2016 | Crossen | B29C 67/0096 |
| 9,469,309 B2* | 10/2016 | Yagci | B60L 8/003 |
| 9,498,960 B2* | 11/2016 | Bradway | B41J 2/16544 |
| 9,592,638 B2* | 3/2017 | Fromm | B29C 67/0085 |
| 9,592,639 B2* | 3/2017 | Anderson, Jr. | B29C 67/0096 |
| 9,597,840 B2* | 3/2017 | Bradway | B29C 67/0096 |
| 2006/0048800 A1* | 3/2006 | Rast | A47L 1/02 134/56 R |
| 2006/0090667 A1* | 5/2006 | Liebman | A63H 19/24 105/157.2 |
| 2008/0216702 A1* | 9/2008 | Leonowicz | E01B 31/02 104/279 |
| 2011/0125307 A1 | 5/2011 | Dickson et al. | |
| 2012/0157277 A1 | 6/2012 | Moorlag et al. | |
| 2013/0293652 A1 | 11/2013 | Spence et al. | |
| 2013/0293653 A1 | 11/2013 | Spence et al. | |
| 2014/0125749 A1 | 5/2014 | Spence | |
| 2016/0158818 A1* | 6/2016 | Atwood | B08B 1/008 134/6 |
| 2016/0176119 A1* | 6/2016 | Thresh | B29C 67/0096 264/39 |
| 2016/0221260 A1* | 8/2016 | Steurrys | B29C 67/0059 |
| 2016/0263824 A1* | 9/2016 | Roscoe | B29C 67/0059 |
| 2016/0311166 A1* | 10/2016 | Campbell | B29C 67/0059 |
| 2016/0311169 A1* | 10/2016 | Atwood | B29C 67/0096 |
| 2016/0311170 A1* | 10/2016 | Russel | B29C 67/0096 |
| 2016/0311171 A1* | 10/2016 | Bradway | B29C 67/0096 |
| 2016/0311172 A1* | 10/2016 | Crossen | B29C 67/0096 |
| 2016/0311173 A1* | 10/2016 | Anderson, Jr. | B29C 67/0096 |
| 2016/0311226 A1* | 10/2016 | Bradway | B41J 2/16544 |
| 2016/0320123 A1* | 11/2016 | Fromm | F26B 5/005 |
| 2016/0339638 A1* | 11/2016 | Fromm | B29C 67/0085 |
| 2017/0120539 A1* | 5/2017 | Bradway | B29C 67/0096 |

* cited by examiner

CLEANING CART WITH RECHARGEABLE POWER SUPPLY

TECHNICAL FIELD

This disclosure relates generally to printing systems, and in particular, to maintenance devices used in three-dimensional object printing systems.

BACKGROUND

Digital three-dimensional object manufacturing, also known as digital additive object manufacturing, is a process of making a three-dimensional solid object of virtually any shape from a digital model. Three-dimensional object printing is an additive process in which one or more ejector heads eject successive layers of material on a substrate in different shapes. Typically, ejector heads, which are similar to printheads in document printers, include an array of ejectors that are coupled to a different source of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional object printing is distinguishable from traditional object-forming techniques, which mostly rely on the removal of material from a work piece by a subtractive process, such as cutting or drilling.

Figure 11:
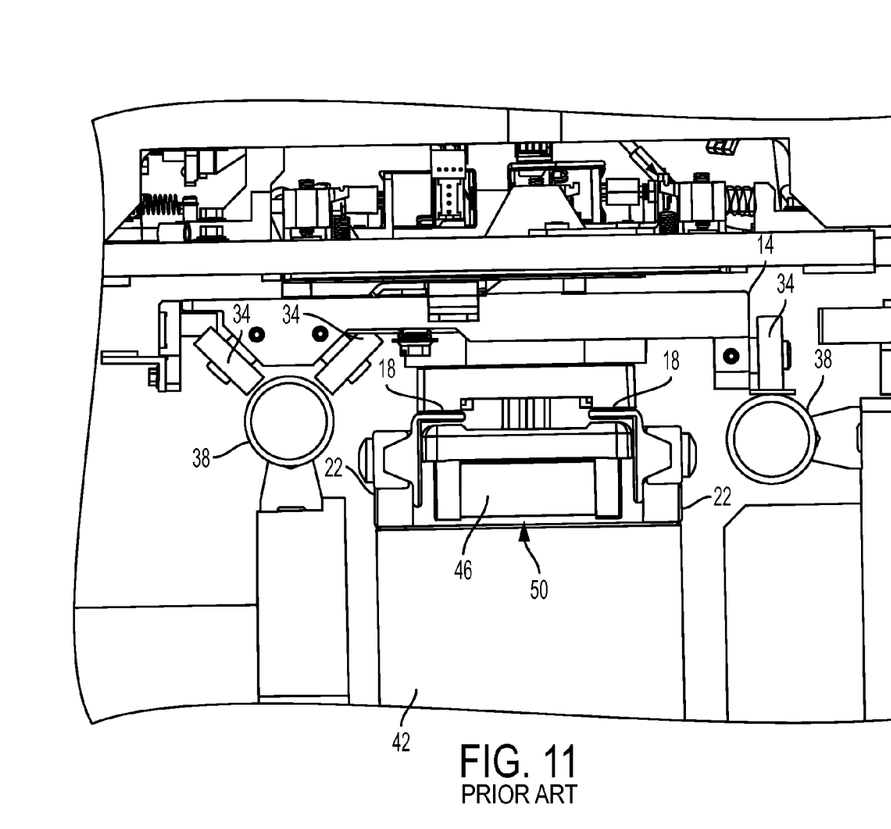
FIG. 11 is a rear view of a known mobile cart that moves through a printing system.
Figure 12:
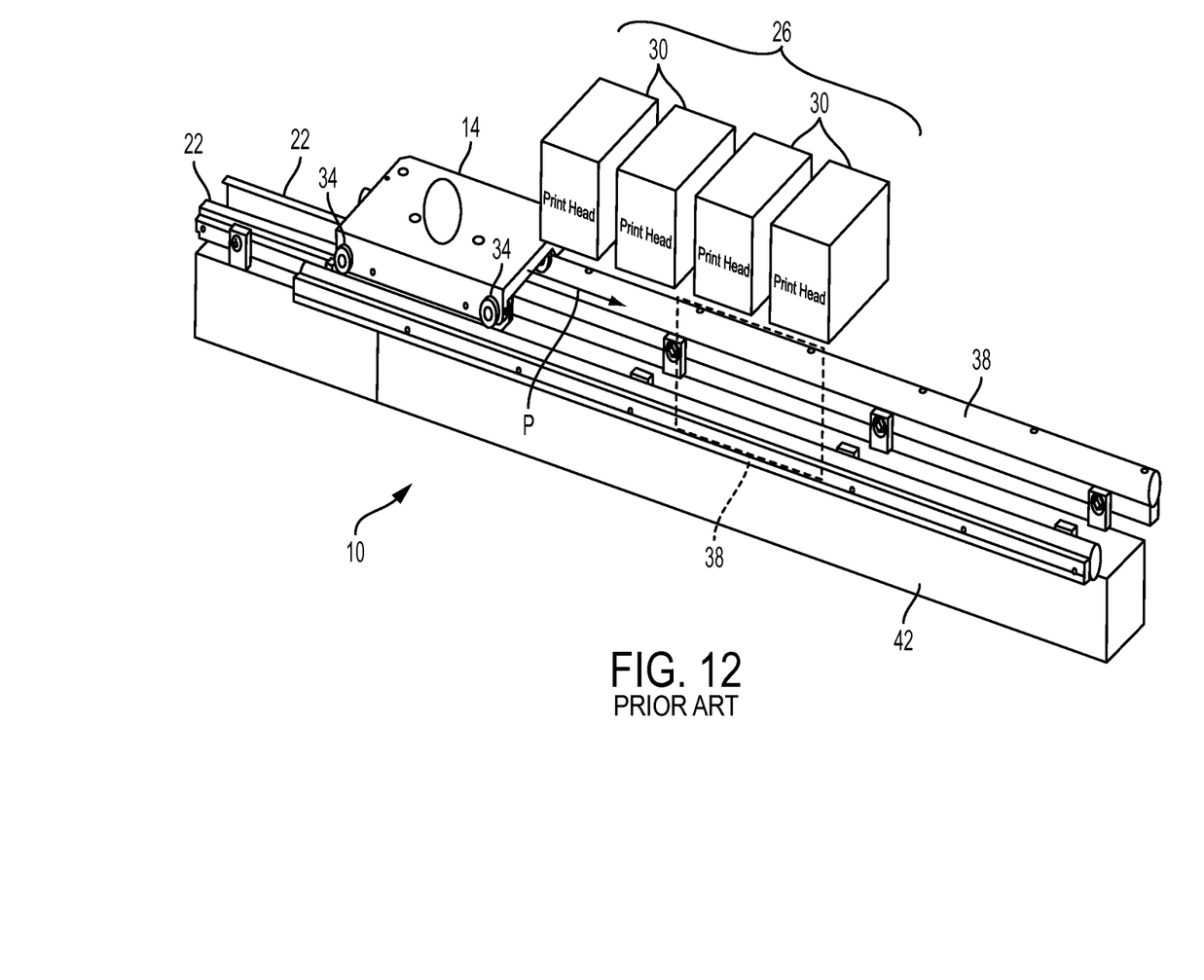
FIG. 12 is a perspective image of a known printing system.

A previously known three-dimensional object printing system 10 is shown in FIG. 12. In the view depicted in that figure, a platform 14, called a cart, includes surfaces 18 (FIG. 11) that slide upon track rails 22 to enable the cart to move in a process direction P between printing stations, such as the printing station 26 shown in FIG. 12. Alternatively, carts can include wheels configured to roll along tracks, or other types of acceptable mobility mechanisms. Printing station 26 includes four ejector heads 30 as shown in the figure, although fewer or more ejector heads can be used in a printing station. Once the cart 14 reaches the printing station 26, the cart 14 transitions to and moves along precision rails 38 through the printing station. Precision rails 38 are cylindrical rail sections that are manufactured within tight tolerances to help ensure accurate placement and maneuvering of the cart 14 beneath the ejector heads 30. Linear electrical motors are provided within housing 42 to interact with a magnet inside housing 46, which is connected to the lower surface of the cart 14. The motors generate electromagnetic fields that interact with the magnet to propel the cart along the track rails 22 between print stations and along the precision rails 38 within the printing stations. Once the cart 14 is beneath the printing station 26, ejection of material occurs in synchronization with the motion of the cart. Electrical motors (not shown) are operatively connected to a gantry to which the ejector heads are mounted to move the ejector heads in an X-Y plane that is parallel to an upper surface of the cart 14 as layers of material are formed in the object. Additional motors (not shown) move the printing station 26 vertically with respect to the cart 14 as layers of material accumulate to form an object. Alternatively, a mechanism can be provided to move an upper surface of the cart 14 vertically and horizontally for formation of the object. Once the printing to be performed by a printing station is finished, the cart 14 is moved to another printing station for further part formation, layer curing, or other processing.

An end view of the system 10 is shown in FIG. 11. That view depicts in more detail the surfaces 18 that rest upon the rails 22 that extend from and above the electrical motor housing 42. As the motors generate electromagnetic fields that interact with the magnet in housing 46, the surfaces 18 of the cart 14 slide along the track rails 22. At the printing station, the bearings 34 of the cart 14 contact the precision rails 38 in an arrangement that facilitates accurate positioning of the build platen on the cart 14. Specifically, bearings 34 are positioned at a right angle to one another on one of the rails 38 to remove four degrees of freedom of the cart 14, while the other bearing 34 rests on the other rail 38 to remove one more degree of freedom. Gravity and magnetic attraction between the electrical motor and the magnet in the housing 46 hold the bearings 34 in contact with the rails 38.

When carts are not present underneath the ejector heads 30, errant drips of materials can fall from the ejector heads and produce undesired debris and contamination on the precision rails 38 and the housing 42. In order to produce three-dimensional objects with acceptable quality, the motion of the cart 14 beneath the ejector heads 30 needs to be precise. If materials from the ejector heads collect where the bearings 34 interface with the precision rails 38, the linear velocity of the cart is disrupted and the quality of the printed object is affected. Additionally, the collection of material drops on top of the housing 42 may also disrupt the linear velocity of the cart and affect the quality of the printed objects. Therefore, improvements in three-dimensional object printing systems that help eliminate the contamination on the precision rails and motor housing that affects the accuracy of the placement and movement of the cart would be beneficial.

Regular maintenance to the ejector heads 30 and other printing stations is beneficial for maintaining accurate and efficient operation of the printing system 10, and for preventing material and other contaminants from accumulating on the precision rails and motor housing. Conventional three-dimensional object printing system maintenance devices often require lengthy interruptions of the printing process, and include complex machinery beyond the components necessary for three-dimensional object printing that can increase the machine footprint of the system. One example of a conventional maintenance device includes a maintenance cabinet separate from the printing system 10 that can be positioned next to a printing station to be maintained. The cabinet contains tools usable to maintain the printing station. In another example, an ejector head is moved to engage with a maintenance station configured to maintain the ejector head. Including a maintenance architecture that does not interrupt the printing process and that does not significantly increase the footprint of the printing system would be beneficial.

SUMMARY

A three-dimensional object printing system with an incorporated maintenance system includes a track, a cart that moves along the track, and a recharging station positioned opposite the track. The cart includes a platform, a cleaning device, a rechargeable power supply, and a controller. The cleaning device is configured to remove material from a surface of the printing system as the platform passes by the surface. The rechargeable power supply is configured to be selectively connected to the cleaning device, and is also configured to be recharged via inductive charging. The controller is operatively connected to the rechargeable power supply and the cleaning device, and is configured to selectively connect the rechargeable power supply to the cleaning device and operate the cleaning device to clean the surface. The recharging station is configured to inductively charge the rechargeable power supply when the cart passes by the recharging station.

BRIEF DESCRIPTION OF THE DRAWINGS

The foregoing aspects and other features of the present disclosure are explained in the following description, taken in connection with the accompanying drawings.

DETAILED DESCRIPTION

For a general understanding of the present embodiments, reference is made to the drawings. In the drawings, like reference numerals have been used throughout to designate like elements.

Figure 1:
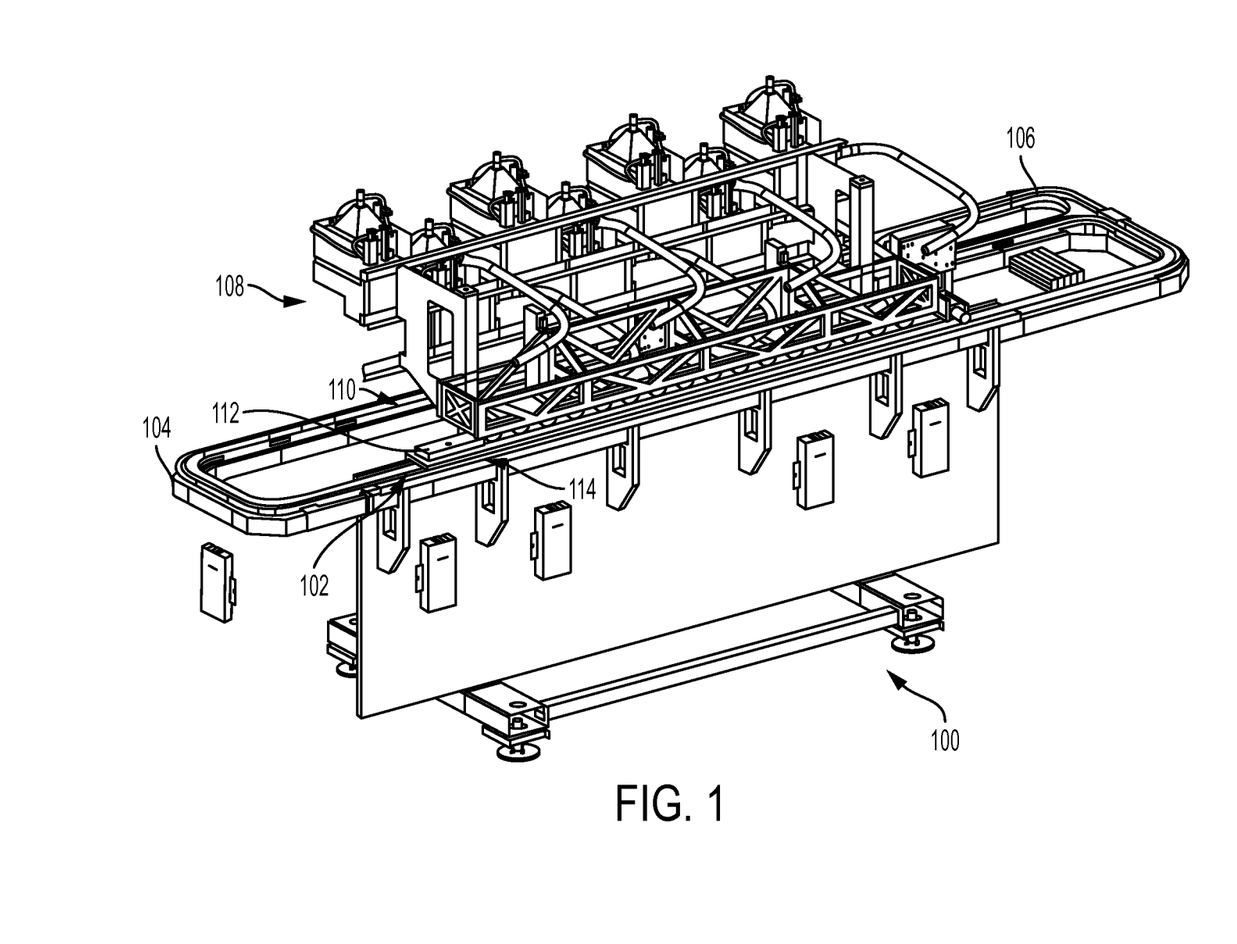
FIG. 1 is a perspective image of an exemplary embodiment of a three-dimensional printing system according to the disclosure.

FIG. 1 illustrates an exemplary embodiment of a three-dimensional object printer 100 that incorporates at least one mobile cart 102. The printer 100 includes a first track 104, a second track 106, and at least one printing station 108 positioned opposite a first portion 110 of the track 104. The mobile cart 102 includes a platform 112 and wheels 114. The platform 112 is configured to support material for forming a three-dimensional object, while the wheels 114 connected to the platform 112 are configured to engage and roll along the first track 104.

In general operation, the mobile cart 102 moves along the first track 104 past the printing station 108, which includes at least one ejector head configured to eject material onto the platform 112 of the mobile cart 102 to form a three-dimensional object. The second track 106 is configured to support at least one maintenance cart (not shown), described in further detail below. During a maintenance operation, maintenance carts can be operated to move from the second track 106 to the first track 104 and pass by the ejector heads of the station 108 to perform a maintenance operation on the ejector heads. In other embodiments, the printer does not include a second track, and maintenance carts move along the first track 104 in conjunction with the mobile cart 102.

Ejector heads for three-dimensional printing object systems typically require maintenance over extended use, such as at regular intervals, after a predetermined number of printing operations, or upon detection of a maintenance issue, in order to maintain accuracy, efficiency, and operability necessary for three-dimensional object printing. Ejector heads can become obstructed or clogged with extraneous material, foreign materials can contaminate or damage ejector heads, and material can build up on the track 104 or other portions of the printing system 100 and interfere with the printing operation.

The tracks in a printing system may also require regular maintenance that includes removing debris, such as material ejected by the ejector heads, and inspecting tolerances or other conditions of the tracks. Printing stations may require servicing, recalibrating, or repair, and mobile carts can require servicing or assistance upon becoming stuck. Furthermore, in the event of a power failure, such as in a mechanical fault or other fault condition, being able to proceed with maintenance procedures without interruption would be beneficial since an interruption in proper maintenance of the printing system can result in damage to the printing system or printed objects. Additionally, benefits would arise from the coordination of the performance of different maintenance tasks in order to reduce an impact that such processes have on the printing process of the printing system.

Figure 2:
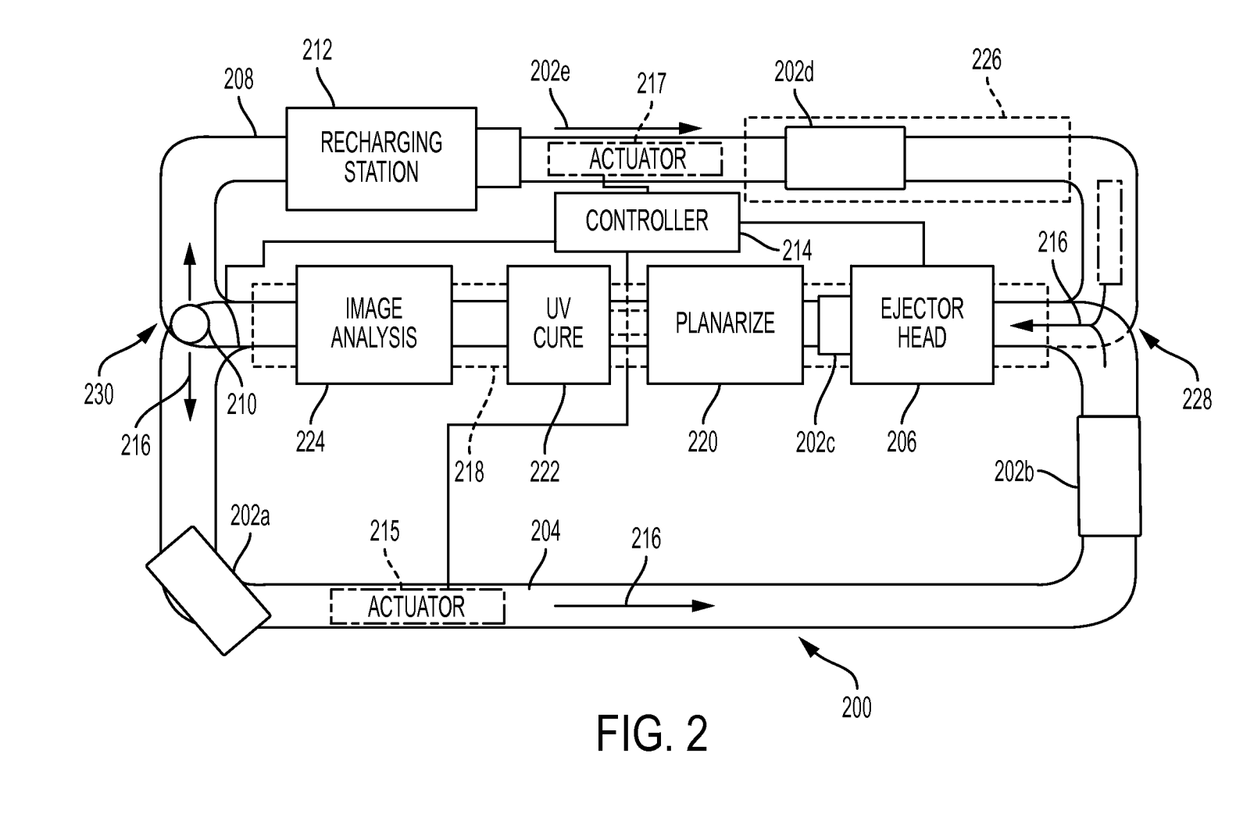
FIG. 2 is a schematic diagram of another exemplary embodiment of a three-dimensional printing system according to the disclosure.

FIG. 2 illustrates a schematic view of a three-dimensional object printing system 200 that incorporates a maintenance system that coordinates well with the printing process performed by the printing system 200. The system 200 includes at least one platform, such as the platforms 202a-e, a first track 204, an ejector head 206, a second track 208, a switch 210, a recharging station 212, and a controller 214. In the embodiment of FIG. 2, platforms 202a and 202b are build platforms configured with a build platen to support an object being produced by the system, while platforms 202c-202e are maintenance platforms. Each of the platforms 202a-e includes a plurality of wheels (not shown, see, e.g., FIG. 3) or other mobility mechanisms that are configured to enable the platforms to move along the first and second tracks 204, 208 and through the system 200. The platforms 202a and 202b include a magnet within a housing like the one described above with regard to FIG. 12 to enable the linear motors along the tracks 204, 208 to propel the platforms along the tracks. Other types of propulsion systems, such as motors powering the plurality of wheels of a platform, conveyers, or blowers are also contemplated. Other types of mechanisms that enable the platforms to move along the first track 204, such as sliding surfaces, air cushions, or other suitable mechanisms, in addition to or instead of the plurality of wheels. The reader should understand that in the present embodiment, the first track 204 is a continuous loop, and the process direction 216 refers to a direction of motion around the loop which, in FIG. 2, is counter-clockwise.

The ejector head 206 is configured to eject material for forming a three-dimensional object, and is positioned opposite a first portion 218 of the first track 204. As illustrated in FIG. 2, the first portion 218 includes multiple printing stations in addition to the ejector head 206, such as a planarizing station 220, a UV cure station 222, and an image analysis station 224, but other configurations and numbers of printing stations are also contemplated. In one embodiment, at least one printing station is located opposite another portion of the first track 204 spaced apart from the first portion 218. Although illustrated as a single ejector head, the reader should understand that the ejector head 206 can be an array of ejector heads. Moreover, the system 100 can include additional ejector heads or arrays of ejector heads positioned opposite the first track 204.

The controller 214 is operatively connected to the ejector head 206 and is configured to operate the ejector head as the build platforms in platforms 202a-202e move along the first track 204 past the ejector head in the process direction 216. The controller 214 is also operatively connected to other printing stations and is configured to perform other printing operations via the other printing stations. The connections between the controller and the other printing stations 220-224 are not shown in FIG. 2 for the purpose of clarity.

The system 200 includes at least one maintenance platform, such as the platforms 202c-e. Maintenance platforms are operable to perform an operation on various portions of the printing system 200 including the first and second track 204, 208, printing stations, such as the ejector head 206 and UV curing station 222, and other platforms in the printing system 200. In this embodiment, a second portion 226 of the second track 208 is configured to support maintenance platforms to enable a maintenance platform, such as the platform 202d, to remain on the second portion 226 during a time period in which the platform 202d is unused, and also includes a recharging station 212. The second track 208 can also include other maintenance cart stations (not pictured), such as a waste receptacle, or other stations configured to facilitate use of the maintenance platforms 202c-e. In another embodiment, the printer 200 does not include a second track, so the maintenance stations described above are positioned opposite a portion of the first track 204, and the first track 204 also supports the maintenance carts 202c-e when not in use with a printing station.

In the embodiment of FIG. 2, the second track 208 is coupled to the first track 204 at a first position 228 to enable maintenance platforms to move from the second track 208 to the first track 204. The first position 228, on the first track 204, is before the first portion 218 in the process direction 216 so a maintenance platform moving from the second track 208 to the first track 204 passes by the first portion 218 when continuing to move along the first track 204. In this embodiment, the maintenance platforms 202c-e are optionally self-propelled with a propulsion device, such as power source 502, motor 506, and drive wheel 508 (FIG. 5), which enables the platform to move along the first track 204 or the second track 208. In one embodiment, the maintenance platforms 202c-e include magnets positioned within a housing of the platform, similar to the build platforms 202a and 202b and the cart illustrated in FIG. 17, or other propulsion mechanisms. The maintenance platforms 202c-e can activate the optionally self-propelled propulsion device if, for example, the entire system loses power, or if the cart needs additional propulsion in a case when the propulsion mechanism typical of carts 202a-b is not sufficient.

The controller 214 is further configured to operate a maintenance platform to perform an operation when the maintenance platform is at a desired location within the printing system 200. In another embodiment, maintenance platforms each include an onboard controller configured to operate the platform within the printing system in addition to or instead of the controller 214. A particular platform can be operable to perform a particular type of operation or can be operable to perform a variety of operations. For instance, the printing system 200 can include one or more maintenance platforms that are each operable to perform a different maintenance operation, one or more maintenance platforms that are each operable to perform a plurality of operations, or both.

The first track 204 is selectively coupled to the second track 208 at a second position 230 that is after the first portion 218 in the process direction 216. In the present embodiment, the switch 210 is operable to selectively couple the first and second tracks 204, 208 at the second position 230, but other selective coupling mechanisms are also contemplated. The controller 214 is operatively connected to the switch 210, and is further configured to operate the switch 210 to return maintenance platforms to the second track 208, and to enable media platforms to remain on the first track 204. In another embodiment, the onboard controller of maintenance platforms 202c-e is configured to operate the switch 210 via, for example, a wireless communication device, a selective electrical connection, or any other acceptable type of communication.

As illustrated in FIG. 2, when the second track 208 is coupled with the first track 204, another continuous loop is formed by the second track 208 and the first portion 218 of the first track 204. In the present embodiment, the maintenance platforms 202c-e move along the other continuous loop in a clockwise direction such that both the maintenance platforms 202c-e and the build platforms 202a and 202b move along the first portion 218 in the same direction. While this embodiment includes two continuous loops, other embodiments can include other numbers of continuous loops. In one embodiment, different maintenance platforms, such as platforms operable to perform different operations, are configured to move along different continuous loops. In another embodiment, one or more printing stations or maintenance stations are positioned on a portion of a continuous loop so other platforms are able to move along a different loop while a particular platform engages with the station. The maintenance carts 202c-e, when moving around the printing system 200, are not limited by a direction of travel, and may travel in any direction or path around the tracks 204, 208 that enables them to perform maintenance functions. The controller 214 may direct other carts to take a different path or direction to facilitate the use of a maintenance cart for a specific function.

Maintaining the printing stations and tracks while minimizing interruptions in the printing process of the system 200 can beneficially enable a steady workflow of printing operations, and a decrease in downtime for printing station upkeep. Maintenance platforms should not collide with or impede the movement of other platforms. Advantageously, the controller 214 can be further configured to coordinate movement of maintenance platforms 202c-e with the movement of the build platforms 202a and 202b. In other words, the controller 214 can be configured to schedule an operation on a printing station during a period of time when a build platform is not occupying a printing station. For example, the controller 214 can schedule operations at predetermined intervals, after a predetermined number of printing operations, upon detection of a maintenance fault, such as a clog or contamination, or before or after a particular printing operation.

In another embodiment, onboard controllers on the maintenance platforms enable the maintenance platforms to move and operate within the printing system 200 at least partially independent from the controller 214. In one embodiment, the onboard controllers of the maintenance platforms are further configured to communicate with each other or the controller 214 to coordinate movement through the printing system 200. In another embodiment, an onboard controller of a maintenance platform is configured to operate independently from other controllers.

Different information about a condition of the printing system 200 may be more easily accessible to different components. For example, material debris on the first track 204 may be more readily discovered by a maintenance platform inspecting the first track 204 than by a diagnostic sensor on the ejector head 206. Furthermore, a component that discovers information may not be optimal for performing an operation. For instance, a maintenance platform can detect that material dripped onto the first track 204 from the ejector head 206 and that the ejector head 206 should be cleaned. However, the maintenance platform may already be past the ejector head 206 when this condition is detected. Rather than travelling all the way around the second continuous loop, the operation of cleaning the ejector head 206 or the first track 204 may be more efficiently performed by another maintenance platform that is not yet past the ejector head 206. Therefore, providing for communication between maintenance platforms and other components of the printing system 200 is beneficial.

Because the second track 208 is integrated with the first track 204 so both maintenance platforms 202c-e and build platforms 202a and 202b pass through the first portion 218, a footprint of the printing system 200 is smaller than systems having a maintenance station that is separate from the printing stations. Further, the integrated nature of the maintenance platforms 202c-e with the workflow of the printing process eliminates the need to connect and setup a maintenance station, such as a maintenance cabinet, that may need to be individually moved to and configured to operate with each individual printing station. The printing system 200 according to the present disclosure enables different operations to be performed on different printing stations while eliminating the often time consuming and complicated setup procedures involved in conventional maintenance systems.

Figure 3:
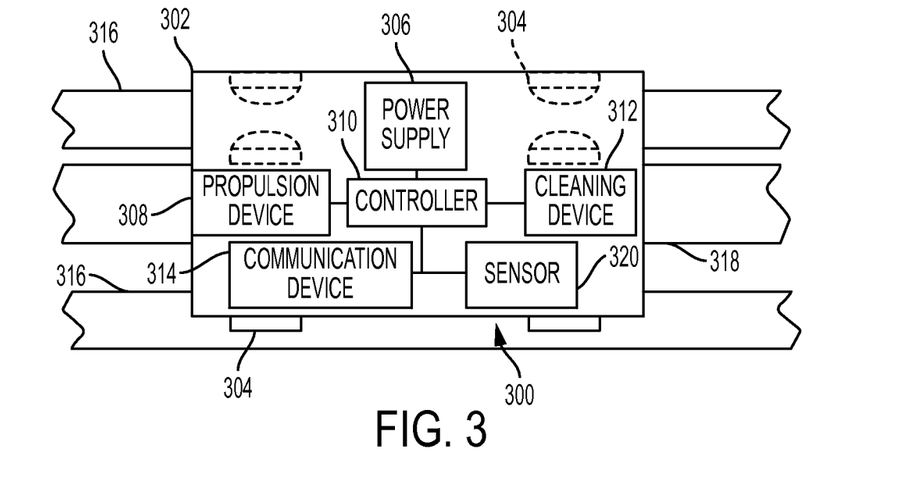
FIG. 3 is a schematic of an exemplary embodiment of a cart that moves through a three-dimensional printing system according to the disclosure.

FIG. 3 illustrates a schematic view of an exemplary embodiment of a cart 300 according to this disclosure. The cart 300 includes a platform 302, a plurality of wheels 304, a power supply 306, a propulsion device 308, a controller 310, a cleaning device 312, and a communication device 314. In different embodiments, one or more of the components 306-314 is housed within the platform 302, or is mounted above or below the platform 302. In one embodiment, the cleaning device 312 can be implemented with devices that are actuated to remove debris, while in other embodiments, the cleaning device 312 can include a surface configured to receive material ejected from the ejector head 206 (FIG. 2) in order to form a three-dimensional object. Other types of cleaning devices are also contemplated.

The plurality of wheels 304 are operatively connected to the platform 302 and enable the cart 300 to move along rails 316 in a printing system as described above with regard to the precision rails 38 in FIG. 11. In another embodiment, the cart 300 includes slide surfaces configured to slide along slide rails similar to slide surfaces 18 and track rails 22 as illustrated in FIG. 11 in addition to or instead of the plurality of wheels 304. The propulsion device 308 is, for example, an actuator and a wheel operatively connected to the actuator. The device 308 is configured to drive the wheel and move the cart 300 along the track 318. In other embodiments, the propulsion device 308 can include, for example, a magnet of the type described above that operatively connects with actuators within a housing of the track 318, or other propulsion mechanisms. The controller 310 is operatively connected to the propulsion device 308, and is further configured to selectively connect the propulsion device 308 with the power supply 306 to enable the cart 300 to move in an optionally self-propelled fashion.

The power supply 306 is a rechargeable power source that is selectively electrically connected to an actuator, and is configured to provide electrical power to other components of the cart 300 including the propulsion system 308, controller 310, cleaning device 312, and communication device 314. Any acceptable rechargeable power source can be utilized. In an example, the power supply 306 is a lithium ion battery, lithium air battery, lithium metal battery, lithium sulfur battery, or metal-air battery. In this embodiment, the power supply 306 is configured to be charged by inductive charging via, for example a wireless charging device, and includes, for example, an induction coil (not shown) configured to receive wireless power from a recharging station of the printing system. In another embodiment, the power supply 306 includes a charging connection interface (not shown) that is configured to couple with a charger connection interface of a recharging station of the printing system.

The communication device 314 enables the controller 310 to communicate with controllers of other carts in the printing system, or a central controller of the printing system. In one embodiment, the cart 300 does not include a communication device, and is thus independent of other carts and the central controller. The communication device can include any acceptable type of communications mechanisms such as an antenna and transmitter, infra-red receiver and emitter, wireless radio, or the like.

The cleaning device 312 is operable to perform at least one operation on the printing system or on another cart in the printing system. The cleaning device 312 can include one or more separate mechanisms for performing different operations, and the cart 300 can include additional cleaning devices 312 as desired. Various types of cleaning devices 312 are contemplated, included the cleaning device described in the embodiments set forth below.

Figure 4:
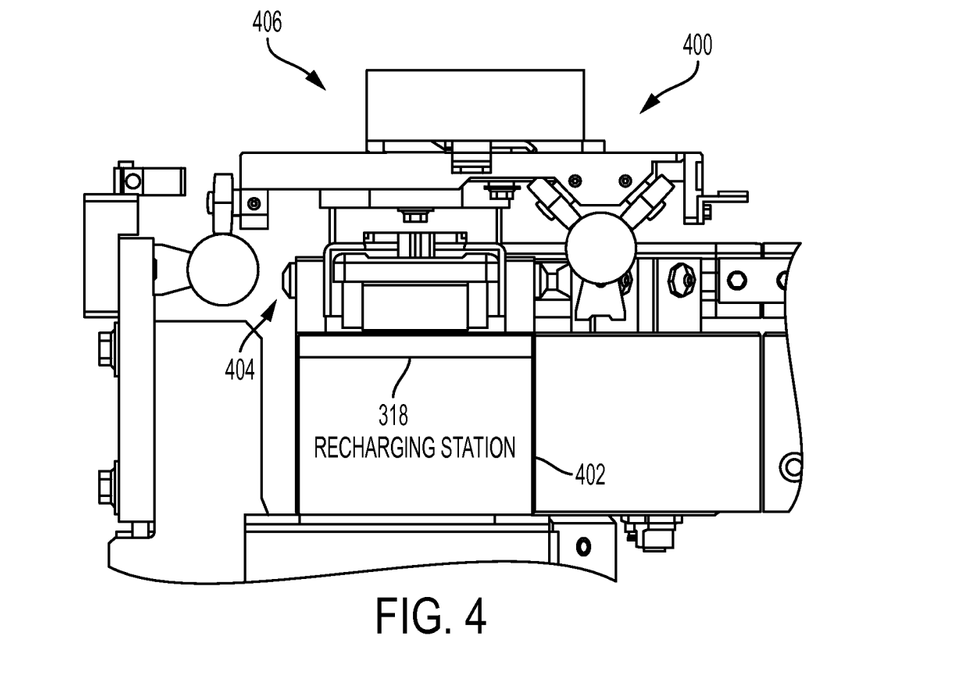
FIG. 4 is a front view of another embodiment of a cart that moves through a three-dimensional printing system according to the disclosure.

FIG. 4 illustrates an exemplary embodiment of a cart 400 positioned at a recharging station 402 according to this disclosure. In this embodiment, the cart 400 includes a first component 404 that has a rechargeable power supply and a propulsion component, and a second component 406 that has a cleaning device. The power supply is positioned within the first component 404 to enable an electrical connection between the power supply and the recharging station 402. The recharging station 402 is configured to electrically connect to a power supply of a cart by any acceptable mechanism to enable the power supply of the cart to recharge, such as by a lead connection or by a wireless induction connection. A controller and communication device can be housed in either component 404, 406, and in other embodiments, different elements are housed within different components. While illustrated as being positioned below the track 318 in FIG. 4, in other embodiments, the recharging station 402 is positioned in other locations such as, for example, laterally offset from the track 318, or above the track 318. In one embodiment, at least a portion of the recharging station, such as a charging connection interface or a wireless induction coil, is at least partially positioned within or integral with the track 318.

In one embodiment, the recharging station 402 is configured to communicate with a controller onboard a cart, or a central controller of the printing system, and is further configured to recharge the power supply of a cart with reference to information received via such communication. In one example, the controller onboard a cart provides the recharging station with information indicative of a condition of the power supply that facilitates recharging the power supply in an efficient manner. In another example, the controller of the printing system can prioritize recharging the power supply to a desired power condition relative to a maintenance task within the printing system. For example, the recharging station 402 can selectively recharge the power supply to less than a completely recharged condition to prioritize performance of a maintenance operation in the system.

Figure 5:
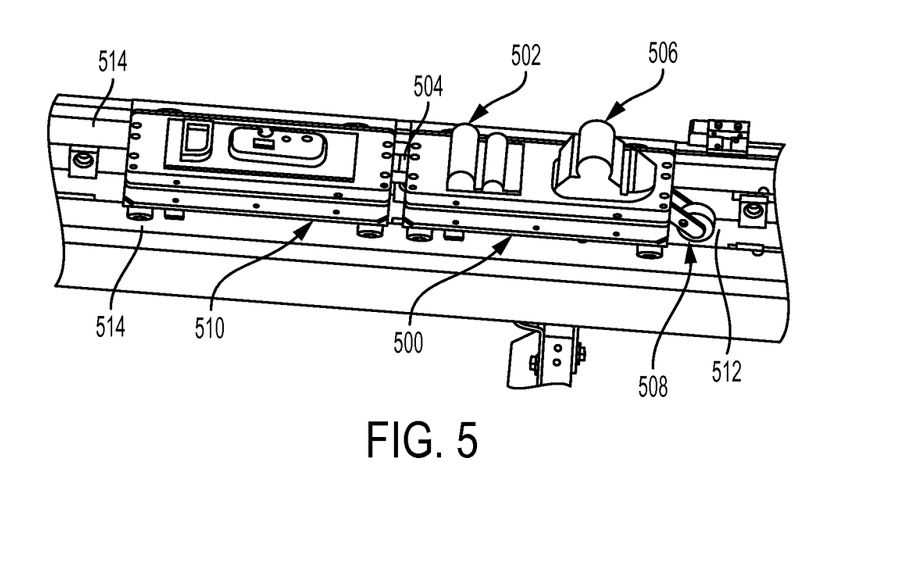
FIG. 5 is a perspective view of an exemplary embodiment of carts that move through a three-dimensional printing system according to the disclosure.

In one embodiment, illustrated in FIG. 5, a cart 500 has a coupling member 504 mounted at end of the cart and a propulsion system 506 that includes a power source 502, a motor 506, and a drive wheel 508. The coupling member 504 is configured to engage with or bear against another cart 510. In different embodiments, the coupling member 504 can be a hitching member, a pushing surface, a magnetic coupler, or any other acceptable coupling mechanism. The drive wheel 508 is configured to roll along a track housing 512 to propel the cart 500 along the tracks 514 of the printing system when operatively connected to an onboard power supply 502. Advantageously, the drive wheel 508 is configured to produce enough torque to move both the cart 500 and the other cart 510 along the tracks 514. The coupling member 504 is configured to connect with the other cart 510 to direct the output of the propulsion system 506 against the cart 510 and move both carts along the tracks 514 of the printing system. This configuration enables the cart 500 to act as a tug to move and reposition other carts within the printing system.

In one example, in response to a power failure of the actuators in the track housing 512 (not illustrated) that strands cart 510 on the tracks 514, the cart 500 can be dispatched to couple with the cart 510 and reposition the cart 510 to a different location in the printing system. In another example, in response to a mechanical failure of a wheel or propulsion system of the cart 510 that interferes with the cart's movement through the printing system, the cart 500 can be dispatched to engage and move the cart 510 to a maintenance area. In a further example, a wheel or propulsion device of the further cart 510 has become dislocated with respect to the tracks 514, and the cart 500 can be dispatched in order to relocate the further cart 510 with respect to the tracks 514.

Returning to FIG. 3, the sensor 320, which is mounted to the platform 302, is configured to generate an electrical signal that corresponds to a condition of a portion of the printing system, such as a surface to be cleaned. The sensor 320 can include, for example, one or more cameras configured to generate image data corresponding to portions of the printing system, such as the rails 316 or track 318, another cart, or a printing station. In an embodiment, the controller 310 is operatively connected to the sensor 320 to receive image data generated by the sensor 320 and is further configured to analyze the image data to, for example, detect debris, locate another cart, or assess a condition of a printing station or another portion of the printing system. The sensor 320 can include an accelerometer configured to, for example, detect debris on a rail 316 or track 318 by generating an electrical signal in response to motion resulting from a discontinuous surface due to the debris. The sensor 320 can also include other types of sensors, such as a sensor configured to detect a maintenance condition of an ejector in an ejector head.

In one embodiment, the controller 310 is configured to transmit the electrical signal corresponding to the condition of the portion of the printing system to, for example, a central controller of the printing system, via the communication device 314, to enable the cart 300 to act as a remote diagnostic apparatus. Such a central controller can be configured to diagnose a maintenance condition of the printing system and take appropriate action. In other embodiments, inspection and diagnosis of the printing system is shared between one or more carts and the central controller. In an example, a first cart detects debris on a portion of a track via an accelerometer and transmits this information to the central controller via a communication device. In response, the central controller operates another cart to generate image data of the portion of track with a camera in order to diagnose further the status of the track.

The cleaning device 312 is operable to perform a maintenance operation on the printing system. In one embodiment, the controller 310 is configured to connect the cleaning device 312 selectively to the power supply 306 and operate the cleaning device 312 to perform the maintenance operation in response to the electrical signal generated by the sensor 320. In another embodiment, the controller 310 is configured to operate the cleaning device 312 to perform the maintenance operation in response to an electrical signal corresponding to operation instructions received via the communication device 314. In another embodiment, the controller 310 is configured to operate the cleaning device 312 in concert with other carts within the printing system. In another embodiment, the controller 310 operates the cart 300 to perform maintenance operations independently. Various types of maintenance operations are contemplated, including the specific examples described below.

Figure 6:
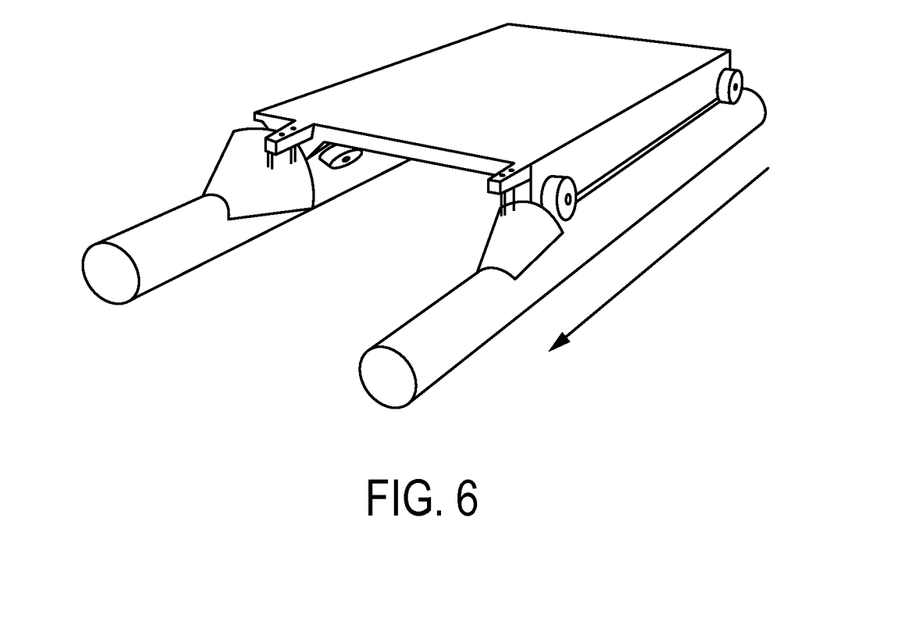
FIG. 6 is a perspective view of another embodiment of a cart that moves through a three-dimensional printing system according to the disclosure.
Figure 7:
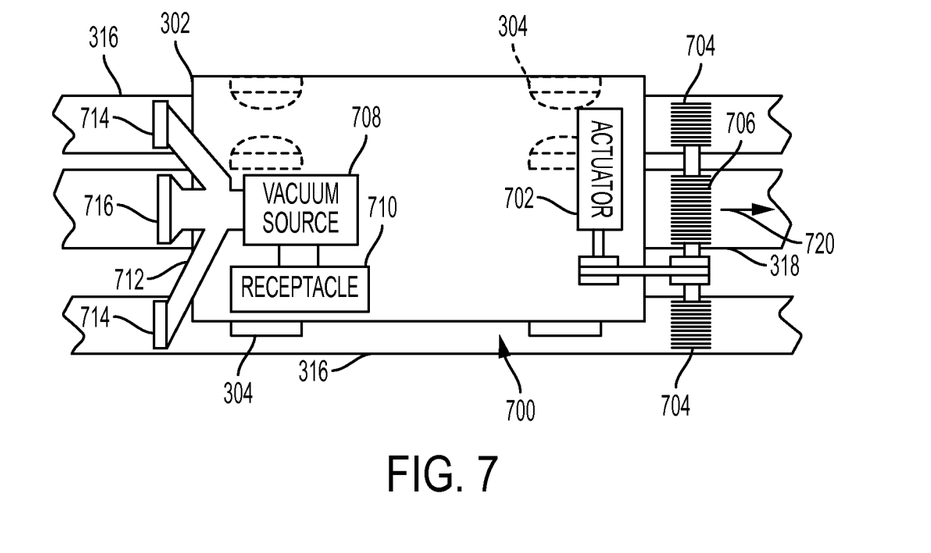
FIG. 7 is a schematic of another exemplary embodiment of a cart that moves through a three-dimensional printing system according to the disclosure.

In one example of a maintenance operation, debris, such as material ejected from an ejector head, or other matter, is removed from a rail 316 or track 318. In such case, the maintenance device can include, for example, a plow or scraper configured to remove debris, as illustrated in FIG. 6, or a powered debris removal device, such as a powered brush as illustrated in FIG. 7. FIG. 7 illustrates a cart 700 that includes an actuator 702, a set of brushes 704, 706, a vacuum source 708, a receptacle 710, a vacuum manifold 712, and a set of nozzles 714, 716. Other components, such as an onboard power supply, controller, sensor, propulsion device, communication device, and cleaning device can also be included with the cart 700, but are omitted in FIG. 7 for the sake of clarity.

The brushes 704, 706 of cart 700 are operatively connected to the actuator 702, which is configured to move the brushes 704, 706 and clean the rails 316 and track 318. The actuator 702 can be selectively connected to a power supply or a controller configured to operate the actuator to move the brushes 704, 706. The brushes 704, 706 are configured and arranged to enable the brushes 704, 706 to contact debris on the rails 316 and track 318 and remove or dislodge the debris as the cart 700 moves in the process direction 720. The reader should understand that abrasive surfaces, other than brushes, can be configured for selective engagement with the rails and tracks to clean them. The vacuum source 708 is configured to generate a vacuum, and the vacuum manifold 712 is configured to distribute the vacuum among the nozzles 714, 716. The nozzles 714, 716 are configured and arranged to enable the vacuum to draw the debris or material removed or dislodged from the rails 316 and track 318 through the manifold 712 and into the receptacle 710. The receptacle 710 is configured to store the vacuumed debris, and can further include, for example, a closable lid or removable bin (not illustrated) or other mechanism that facilitates removal of the stored debris.

While FIG. 7 illustrates the brushes 704, 706 as being in front of the cart 700 in the process direction 720, and the nozzles 714, 716 as being behind the cart 700 in the process direction, in other embodiments, nozzles and brushes can be positioned at various acceptable locations as would be understood by one of ordinary skill in the art. In an example, brushes can be positioned between nozzles and a rear of the cart 700, or nozzles can be positioned between the front of the cart and brushes. Generally, positioning brushes in front of nozzles in the process direction enables the nozzles to capture debris loosened by the brushes, but other configurations, such as one in which the nozzles are in front of brushes, and one in which the brushes include nozzles are also contemplated. Other types of maintenance devices that enable clearing debris are also contemplated, such as a device configured to dispense a cleaning agent or solvent that facilitates the removal of debris, a device configured to dispense an agent, heat, or light, in order to solidify or liquefy debris in order to facilitate its removal, or other acceptable debris removal mechanisms.

In an example of an operation on a printing station, when maintenance platform 202c is positioned opposite the ejector head 216 (FIG. 2), the controller 214 is configured to operate the ejector head 206 to eject material onto the maintenance platform 202c. Such ejection can purge material and contaminants from the ejector head 206, remove or prevent a clog, clean material from the ejector head 206, or prevent material from accumulating on, for example, the first track 204.

Figure 8:
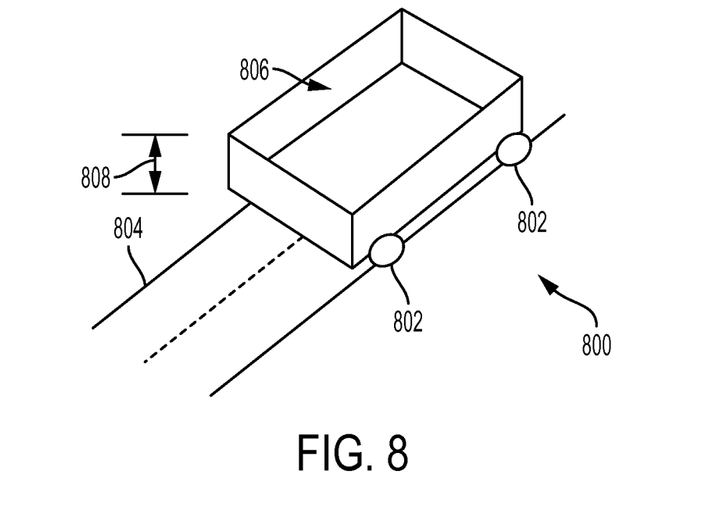
FIG. 8 is a perspective view of another embodiment of a cart that moves through a three-dimensional printing system according to the disclosure.

FIG. 8 illustrates an exemplary embodiment of a maintenance platform 800 that includes a plurality of wheels 802 configured to engage with a track 804 and a tray 806 configured to receive material ejected from an ejector head. The tray 806 has a height 808 configured to retain ejected material in the tray. In one embodiment, the platform 800 is configured to stop beneath the ejector head to enable the ejector head to purge material into the tray 806. While integrating maintenance platforms with media platforms to perform operations as described above is beneficial to reducing delay in the printing process, purging material from an ejector head may result in a delay before the ejector head is again usable for printing onto a media platform. In another embodiment, the platform 800 remains in motion along the track 804 while the ejector head purges material into the tray 806 as the platform 800 passes the ejector head, thereby further reducing or even eliminating the delay. The platform 800 can move along the track 804 at full process speed, or at a reduced rate of speed to facilitate the purging of material from the ejector head.

Figure 9:
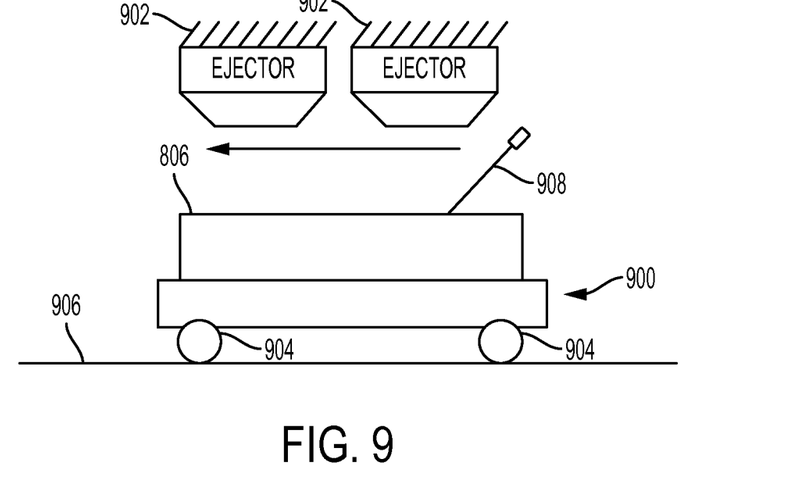
FIGS. 9 and 10 are side views of additional different exemplary embodiment of a cart that moves through a three-dimensional printing system according to the disclosure.

In another example of a maintenance operation, a face of a printing station, such as the ejector head 206 (FIG. 2), is wiped to remove extraneous material or contaminants, remove or prevent clogs, and otherwise maintain the printing station. The controller is configured to move maintenance platform 202c past the ejector head 206 and operate the maintenance platform 202c to wipe a face of the ejector head 206, for example, via a wiping mechanism. FIG. 9 illustrates an exemplary embodiment of a maintenance platform 900 that is operable to wipe an ejector head 902. The platform 900 includes wheels 904 configured to engage with a track 906 and a wiper 908 connected to the platform 900. The wiper 908 is positioned and configured to wipe the ejector head 902 when the platform 900 is moved along the track 906 past the ejector head 902. The wiper 908, in this embodiment, is a rigid wiper that wipes as the platform 900 moves along the track. Other types of wipers are also contemplated, such as wipers actuated by passive or active actuators.

Performing different operations in sequence or in conjunction can be beneficial. In the illustrated embodiment, the platform 900 further includes a tray 806 configured to receive material purged or wiped from the ejector head 902, and the wiper 908 is connected to the tray 806. Thus, a material purging operation to purge material from the ejector head 902 before performing a wiping operation enables the tray 806 to collect the cleared material as the tray passes the ejector head 902 before the wiper 908. The subsequent wiping of the ejector head 902 with the wiper 908 helps ensure the face of the ejector head 902 is clean. Both purging and wiping the ejector 902 in this order enables the ejector 902 to be both ready to operate efficiently and to be free from purged material.

In a further example of a maintenance operation, covering an ejector head during a period of time in which the ejector head is unused can be beneficial to protect the ejector head from damage and contamination and to inhibit material within the ejector head from solidifying and potentially forming clogs. In another example, some types of materials ejected by an ejector head, such as UV curing material, can be volatile, and covering the ejector head during periods of nonuse limits the exposure of such materials to the environment.

Figure 10:
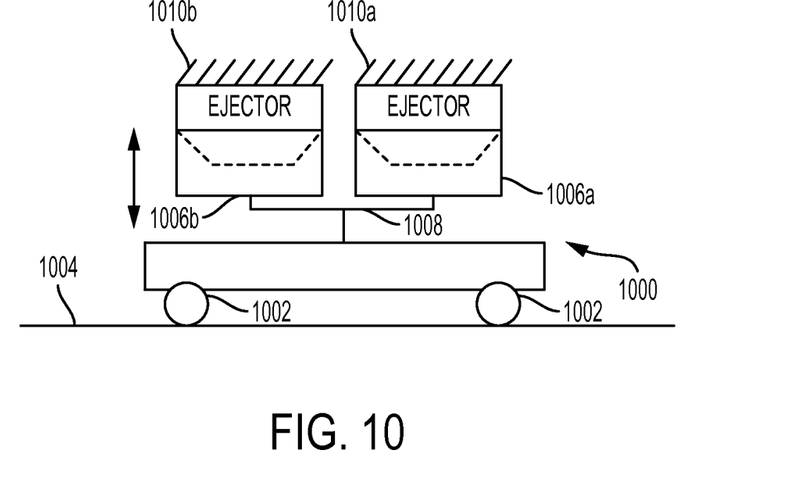

FIG. 10 illustrates an exemplary embodiment of a platform 1000 that includes wheels 1002, covering members 1006a and 1006b, and an actuator 1008. The wheels 1002 are configured to engage with and roll along the track 1004. The covering members 1006a and 1006b are configured to cover ejector heads 1010a and 1010b. While the platform 1000 is illustrated as including two covering members 1006a and 1006b, the reader should understand that the platform 1000 can include different numbers of covering members to comport with different numbers of ejector heads in an ejector head array. The actuator 1008 is operatively connected to the covering members 1006a and 1006b and is configured to cover the ejector heads 1010a and 1010b with the covering members 1006a and 1006b when the platform 1000 is positioned opposite the ejector heads 1010a and 1010b. While FIG. 10 illustrates the two covering members 1010a and 1010b as being operatively connected to a single actuator 1008, other numbers of covering members can be connected to a single actuator. In one embodiment, each covering member is operatively connected to a respective actuator to enable separate ejector heads to be covered or uncovered independently of one another. The actuator 1008 is, for example, operatively connected to the controller 212 (FIG. 2) or the onboard controller 310 (FIG. 3), which can be configured to operate the actuator 1008 to cover the ejector heads 1006a and 1006b during a period of time in which the ejector heads 1010a and 1010b are unused, and can further be configured to uncover the ejector heads 1006a and 1006b to enable the platform 1000 to depart from the ejector heads 1006a and 1006b. Other types of covering mechanisms are also contemplated such as, for example, a covering mechanism configured to respond to a passive actuator, a covering mechanism configured to selectively cover a particular ejector head, and other types of covering mechanisms.

Inspecting the printing system in conjunction with performing maintenance operations or printing operations may be beneficial. In one example, a maintenance operation is performed in response to an inspection that diagnosed a maintenance condition of the printing system. In another example, an inspection is performed to determine whether a maintenance operation was successful. In a further example, a printing operation is not scheduled until an inspection indicates a printing station is in a satisfactory maintenance condition. In one embodiment, the controller 212 (FIG. 2) or onboard controller 310 (FIG. 3) coordinates inspections, maintenance operations, and printing operations within the printing system to facilitate efficient printing.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A cart that moves through a three-dimensional object printing system comprising:
    a platform;
    a cleaning device configured to remove material from a surface as the platform passes the surface;
    a rechargeable power supply configured to be connected to the cleaning device;
    a sensor mounted to the platform, the sensor being configured to generate an electrical signal corresponding to the surface; and
    a controller operatively connected to the rechargeable power supply, the sensor, and the cleaning device, the controller being configured to connect the rechargeable power supply to the cleaning device and to operate the cleaning device to clean the surface by removing the material from the surface in response to the electrical signal generated by the sensor indicating material on the surface.

2. The cart of claim 1, the sensor further comprising:
    a camera; and
    the controller being operatively connected to the camera to receive image data generated by the camera, the controller being further configured to analyze the image data received from the camera to detect material on the surface to be cleaned.

3. The cart of claim 1, the sensor further comprising:
    an accelerometer; and
    the controller being operatively connected to the accelerometer to receive data generated by the accelerometer, the controller being further configured to analyze the data received from the accelerometer to detect material on the surface to be cleaned.

4. The cart of claim 1, the rechargeable power supply being further configured to be recharged by an inductive charger.

5. The cart of claim 1 further comprising:
    a wheel operatively connected to the platform to move the platform along a track;
    an actuator operatively connected to the wheel; and
    the controller being further configured to selectively connect the actuator to the rechargeable power supply to operate the actuator and move the platform along the track.

6. The cart of claim 5 further comprising:
    a member configured to contact another cart to enable the wheel to move the other cart along the track as the wheel moves the platform along the track.

7. The cart of claim 1, the cleaning device further comprising:
    an abrasive cleaning surface;
    an actuator operatively connected to the abrasive cleaning surface; and
    the controller being further configured to connect the actuator to the rechargeable power supply selectively to operate the actuator and move the abrasive cleaning surface into contact with a track along which the platform moves.

8. The cart of claim 7, the cleaning device further comprising:
    a vacuum source;
    a receptacle operatively connected to the vacuum source to store debris pulled by the vacuum source; and
    the controller being further configured to selectively connect the vacuum source to the rechargeable power supply to operate the vacuum source and move material removed from the surface by the abrasive cleaning surface into the receptacle.

9. A cart that moves through a three-dimensional object printing system comprising:
    a platform;
    a cleaning device configured to remove material from a surface as the platform passes the surface;
    a rechargeable power supply configured to be connected to the cleaning device;
    a wiper;
    an actuator operatively connected to the wiper; and
    a controller operatively connected to the rechargeable power supply and the cleaning device, the controller being configured to connect the rechargeable power supply to the cleaning device, to operate the cleaning device to clean the surface, and to selectively connect the actuator to the rechargeable power supply to operate the actuator and move the wiper into contact with a surface of an ejector head as the platform passes the ejector head.

10. A three-dimensional object printing system comprising:
    a track;
    a cart that includes:
    a platform;
    a cleaning device configured to remove material from a surface as the platform passes the surface;
    a rechargeable power supply configured to be connected to the cleaning device and configured to be recharged by inductive charging;
    a sensor mounted to the platform, the sensor being configured to generate an electrical signal corresponding to the surface;
    a controller operatively connected to the rechargeable power supply, the sensor, and the cleaning device, the controller being configured to connect the rechargeable power supply to the cleaning device and operate the cleaning device to clean the surface by removing the material from the surface in response to the electrical signal generated by the sensor indicating material on the surface; and
    a recharging station positioned opposite the track that is configured to inductively charge the rechargeable power supply when the cart passes by the recharging station.

11. The three-dimensional object printing system of claim 10, the sensor further comprising at least one of:
- (i) a camera, the controller being operatively connected to the camera to receive image data generated by the camera, the controller being further configured to analyze the image data received from the camera to detect material on the surface to be cleaned; and
- (ii) an accelerometer, the controller being operatively connected to the accelerometer to receive data generated by the accelerometer, the controller being further configured to analyze the data received from the accelerometer to detect material on the surface to be cleaned.

12. The three-dimensional object printing system of claim 10, the cart further comprising:
- a wheel operatively connected to the platform to move the platform along a track;
- an actuator operatively connected to the wheel; and
- the controller being further configured to selectively connect the actuator to the rechargeable power supply to operate the actuator and move the platform along the track.

13. The three-dimensional object printing system of claim 12, the cart further comprising:
- a communications device configured to transmit and receive electrical signals; and
- the controller being communicatively connected to the communications device, the controller being further configured to:
- connect the communications device to the rechargeable power supply and operate the communications device to transmit the electrical signal; and
- selectively operate the actuator, the cleaning device, and the sensor with reference to an electrical signal received by the communications device.

14. The three-dimensional object printing system of claim 13 further comprising:
- a printing station operable to perform a printing operation; and
- another controller that is operatively connected to the printing station, the other controller being configured to operate the printing station and selectively transmit the electrical signal received by the communications device.

15. The three-dimensional object printing system of claim 12, the cart further comprising:
- a member configured to contact another cart to enable the wheel to move the other cart along the track as the wheel moves the platform along the track.

16. A three-dimensional object printing system comprising:
- a track;
- a cart that includes:
- a platform;
- a rechargeable power supply;
- a controller operatively connected to the rechargeable power supply; and
- a recharging station positioned opposite the track that is configured to inductively charge the rechargeable power supply when the cart passes by the recharging station; and
- a cleaning device configured to remove material from a surface as the platform passes the surface, the cleaning device comprising at least one of:
  - (i) an abrasive cleaning surface and an actuator operatively connected to the abrasive cleaning surface, the controller being configured to connect the actuator that is connected to the abrasive cleaning surface to the rechargeable power supply selectively to operate the actuator connected to the abrasive cleaning surface and move the abrasive cleaning surface into contact with a track along which the platform moves;
  - (ii) a vacuum source and a receptacle operatively connected to the vacuum source to store debris pulled by the vacuum source, the controller being further configured to selectively connect the vacuum source to the rechargeable power supply to operate the vacuum source and move material removed from the surface by the vacuum source into the receptacle; and
  - (iii) a wiper and an actuator operatively connected to the wiper, the controller being further configured to selectively connect the actuator that is connected to the wiper to the rechargeable power supply to operate the actuator connected to the wiper and move the wiper into contact with a surface of an ejector head as the platform passes the ejector head.

17. The three-dimensional object printing system of claim 16, the cart further comprising:
- a wheel operatively connected to the platform to move the platform along a track;
- an actuator operatively connected to the wheel; and
- the controller being further configured to selectively connect the actuator that is connected to the wheel to the rechargeable power supply to operate the actuator connected to the wheel and move the platform along the track.

18. The three-dimensional object printing system of claim 17, the cart further comprising:
- a communications device configured to transmit and receive electrical signals; and
- the controller being communicatively connected to the communications device, the controller being further configured to:
- connect the communications device to the rechargeable power supply and operate the communications device to transmit the electrical signal; and
- selectively operate the actuator connected to the wheel and the cleaning device with reference to an electrical signal received by the communications device.

19. The three-dimensional object printing system of claim 18 further comprising:
- a printing station operable to perform a printing operation; and
- another controller that is operatively connected to the printing station, the other controller being configured to operate the printing station and selectively transmit the electrical signal received by the communications device.

20. The three-dimensional object printing system of claim 17, the cart further comprising:
- a member configured to contact another cart to enable the wheel to move the other cart along the track as the wheel moves the platform along the track.

* * * * *